United States Patent [19]

Babel

[11] 4,339,962
[45] Jul. 20, 1982

[54] SWITCHING DEVICE FOR VARIABLE SPEED GEARS IN MACHINE TOOLS

[75] Inventor: Werner Babel, Pfronten-Meilingen, Fed. Rep. of Germany

[73] Assignee: Maho Werkzeugmaschinenbau Babel & Co., Pfronten-Meilingen, Fed. Rep. of Germany

[21] Appl. No.: 64,714

[22] Filed: Aug. 8, 1979

[30] Foreign Application Priority Data

Aug. 11, 1978 [DE] Fed. Rep. of Germany ....... 2835303

[51] Int. Cl.³ ............................................. F16H 57/00
[52] U.S. Cl. ........................................ 74/335; 74/411; 74/568 T; 200/35 R; 200/38 R; 200/38 FA; 200/38 BA; 200/38 CA
[58] Field of Search ...................... 74/411, 335, 337.5, 74/845, 567, 568 T, 568 R, 625; 200/27 R, 27 B, 30 R, 31 R, 35 R, 38 R, 38 FA, 38 BA, 38 CA

[56] References Cited

U.S. PATENT DOCUMENTS

| | | | |
|---|---|---|---|
| 2,526,628 | 10/1950 | Belock | 200/31 R X |
| 2,788,675 | 4/1957 | Hosea | 74/335 X |
| 2,857,777 | 10/1958 | Porter | 74/411 X |
| 2,861,469 | 11/1958 | Kintzing | 74/568 |
| 3,098,398 | 7/1963 | Ryan | 74/337.5 X |
| 3,250,090 | 5/1966 | Thompson | 64/11 R |
| 3,257,860 | 6/1966 | Runde et al. | 74/411 X |
| 3,331,254 | 7/1967 | Stoll | 74/568 X |
| 3,332,255 | 7/1967 | Seagreaves et al. | 64/11 R |
| 3,385,080 | 5/1968 | Sorenson | 64/11 R |
| 3,677,099 | 7/1972 | Cork et al. | 74/568 X |
| 3,678,708 | 7/1972 | Ernst et al. | 64/14 X |
| 3,735,062 | 5/1973 | Chestnut et al. | 200/38 R |
| 3,859,821 | 1/1975 | Wallace | 64/11 R |
| 3,861,172 | 1/1975 | Symann | 64/14 |
| 3,952,546 | 4/1976 | Nakano et al. | 64/11 R X |
| 3,955,377 | 5/1976 | Bendall | 64/11 R |

FOREIGN PATENT DOCUMENTS

| | | | |
|---|---|---|---|
| 1477839 | 6/1969 | Fed. Rep. of Germany | 74/335 |
| 7729161 | 9/1977 | Fed. Rep. of Germany | |
| 1271010 | 4/1972 | United Kingdom | 74/568 T |

*Primary Examiner*—Leslie Braun
*Assistant Examiner*—Lawrence J. Gotts
*Attorney, Agent, or Firm*—Brown & Martin

[57] ABSTRACT

A switching device for variable speed gears in machine tools having an assembly which includes a plurality of axially disposed, rotatably-driven cam discs, each of which is associated with an electric microswitch. Non-rotatable spacers serve to position the cam discs. A spherical key bed clamp axially clamps the cam discs together while permitting rotation of individual ones thereof. A non-rotating indicating disc displays the present RPM or respective gear stage. A shock absorber in the individual gear trains between switching bars and their respective electric motors provides sufficient damping and cushioning to prevent a hard start-up impact when the motor is switched on or when a sliding gear block is engaged. The shock absorber may include an elastic linkage or an elastic spur gear in a toothed wheel gear reduction unit located between the motor drive shaft and the link shaft.

8 Claims, 3 Drawing Figures

SWITCHING DEVICE FOR VARIABLE SPEED GEARS IN MACHINE TOOLS

FIELD OF THE INVENTION

This invention relates generally to switching devices for machine tools and is more particularly concerned with cam-operated switches for variable speed gears and with shock-absorbing devices in the gear trains.

BACKGROUND OF THE INVENTION

In existing switching devices for variable speed gears in machine tools that have, for example, a gear shift mechanism with eighteen gear stages and three switching bars, a separate electric servomotor is assigned to each switching bar. A cam disc having several offset trip cams is mounted on each of the servomotor drive shafts. A solid base plate serves as a mounting for a number of microswitches in the electric control circuit. These switches are set at differing radial distances from the axis of the motor shaft. The switches are actuated by the respective trip cams on the disc and transmit corresponding electric impulses to the control system which cause each particular electric motor to be switched on and off as required. When the electric motor, which is screw-mounted on the gear cover, is switched on, the rotary motion of its drive shaft is transferred to a pinion via a keyed-on connector. This pinion continually engages a gear rack attached to a switching bar and thus the rotary motion of the motor shaft is translated into a displacement of the switching bar by virtue of the intermeshing teeth on the gear rack and those on the pinion. An example of a switching device of this type may be found in German Patent DE-Gbm No. 77 29 161 assigned to the assignee of the present invention. In practical application, however, problems have arisen using this common switching arrangement. These problems were caused, on the one hand, by the high shock loading of the mechanical components and, on the other hand, by the unfavorable positioning of the trip cams with respect to the microswitches.

SUMMARY OF THE INVENTION

Broadly speaking, this invention concerns a switching device for variable speed gears in machine tools equipped with several sliding gear blocks and switching bars. Separate electric servomotors and gear trains are employed for switching through the individual gear stages and the system also has driven cam discs, each of which is associated with a fixed electric microswitch.

An object of this invention is to improve the service life and operational reliability of switching devices of the type discussed above and as found in the prior art.

In accordance with the invention, this object is achieved by providing at least one shock absorber between the motor drive shaft and switching bar for each gear grouping. Furthermore, several adjustable cam discs are placed in sequence axially along a shaft, and a microswitch is assigned to each cam disc.

The shock absorbers, located in the individual gear trains, between the switching bars and their respective electric motors, provide sufficient damping and cushioning to prevent hard start-up impact when the motor is switched on or when the sliding gear block is engaged. Thus, the individual structural components of the gear system and of the electric motor are no longer subject to damage. This is especially true for the particularly high shock loadings which occur whenever a new gear stage is engaged and the drive train has a tooth-to-tooth configuration. In these latter instances, engaging a new gear is by no means easy; in accordance with the invention, the controls for the machine tool motor are designed so that the gear wheels in question are rotated exceedingly slowly in alternating directions. Thus, when the switching system is actuated, there is a high probability of a shock-free intermeshing of the gears.

In accordance with one embodiment of the present invention, the shock absorber may comprise a so-called elastic linkage or it may comprise an elastic spur gear in a gear reduction unit located between the motor drive shaft and the link shaft.

The spur gear with its integrated shock absorber includes an elastic rubber ring. The ring is located between the outer steel ring element bearing the cog teeth and the inner hub. The ring is attached to the radially adjoining surfaces of the hub and the ring element by, for example, vulcanization. An embodiment such as this possesses the advantage of requiring very little space and of being manufactured simply and at low cost. In order to achieve a firm bonding between the inner hub, the elastic rubber ring element and the toothed outer ring, the respective contact surfaces may be shaped in the form of undulations, teeth or grooves. This serves to increase the bonding surface between the rubber and the adjacent metal components.

In accordance with a further embodiment of the invention, the individual positioning of the cam discs is accomplished by spacers, each of which is mounted on the shaft between two respective neighboring cam discs. These spacers are non-rotatable but may be shifted axially along the shaft. An axial clamping device, e.g. a spherical key-bed clamp, permits free rotation of the individual cam discs located on the shaft provided these discs are in the unlocked position. In this manner, neighboring cam discs do not undergo simultaneous rotation. On tightening the spherical key-bed lock by means of a screw bolt, the cam discs are firmly pressed axially against the disc-shaped spacers, and thus they are prevented from rotating on the shaft.

If, in accordance with the invention, a shaft is positioned parallel to the drive shaft of the servomotor, then not only may a series of cam discs be mounted axially, without causing the gear system to jut out too far, but also a non-rotating indicating disc may be mounted on the free end of the parallel shaft. The front surface of the disc may bear markings indicating RPM's or the respective gear stage. These markings can be viewed through a window in the plastic housing surrounding the entire gear system. Regardless of whether the machine tool is automatically controlled, or whether the gears are shifted manually by means of levers, an indicator of this type allows gear changes to be monitored in an extremely simple manner.

In practice, an additional advantage of the switching device of the present invention is gained by combining into one integral unit the servomotor base plate and a rigid bushing for the parallel shaft. This unit may then be mounted in a simple manner, onto the gear cover, thus permitting the switching device of this invention to be subsequently easily interchanged with a manually-operated switching assembly. By using a rigid bushing, attached on one side thereof to the motor plate by means of a radial flange and attached on the other side thereof to the gear cover with several screws, a further advantage is gained, and that is that the parallel shaft and the ancillary gear train are held in position with great precision and are not subjected to vibratory motion. The assembly is therefore readily able to withstand sudden, high impact loadings.

BRIEF DESCRIPTION OF THE DRAWINGS

The objects, advantages and features of this invention will be more clearly appreciated from the following detailed description when taken in conjunction with the accompanying drawing in which.

DETAILED DESCRIPTION OF THE PREFERRED EMBODIMENTS

Figure 1:
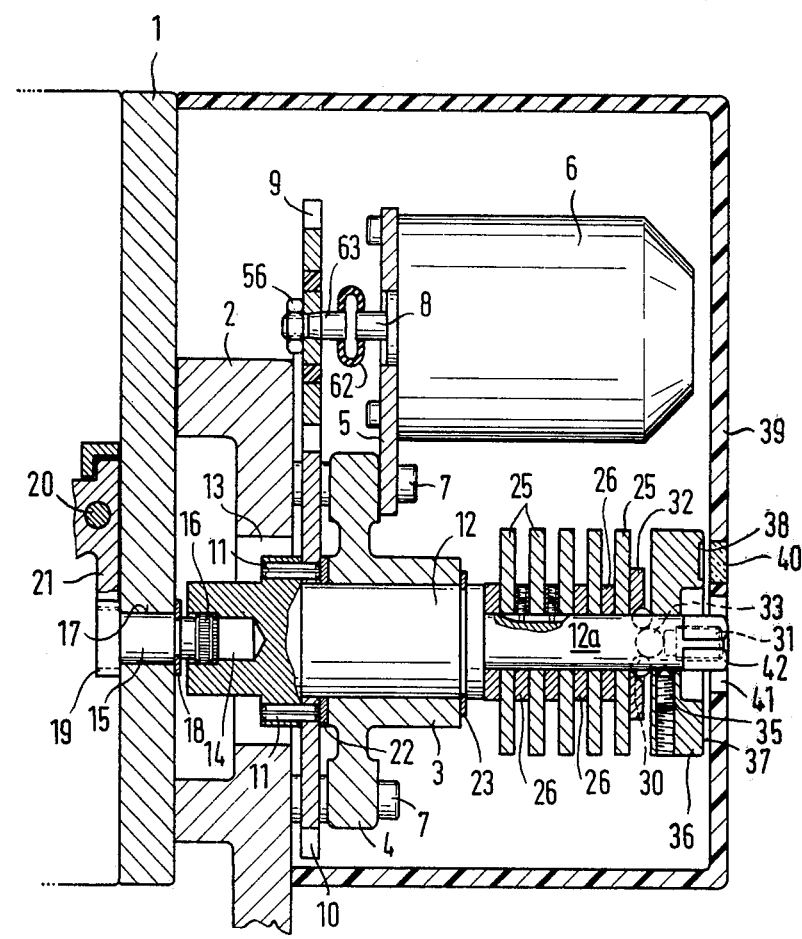
FIG. 1 is a longitudinal cross-sectional view of a switching device depicting one of the switching bars.

The switching device of this invention comprises several of the assemblies shown in FIG. 1. One assembly of this type is required, respectively, for each switching bar in the variable speed drive gear. The assemblies are, essentially, all of similar construction.

A connecting piece 2 is attached to the front plate 1 of a variable speed gear drive (not shown). To this connecting piece are attached a rigid bearing housing, comprising a bushing 3 and a flange 4, and also the support plate 5 of an electric servomotor 6. Attachment is effected by means of the bolts 7. The radial flange 4 of the bushing 3 serves both to brace the bushing itself and to anchor the servomotor 6. A spur gear 9 is coupled to the drive shaft 8 of the electric servomotor 6. This spur gear is shown from the top in FIG. 3. Together with another spur gear 10, spur gear 9 constitutes a reduction gear. Spur gear 10 is firmly attached to the recessed main drive shaft 12 by means of clamping pins 11. The main drive shaft 12 extends into the bushing 3 and projects through an aperture 13 in the connecting piece 2. A shaft journal 15 engages the inner surface of a centrally located drill hole 14 in shaft 12 by means of the splines 16 at the right end of the journal 15 as shown in FIG. 1. The shaft journal 15 rotates in a hole 17 of the gear cover 1, axial displacement thereof being prevented by the lock washer 18. A non-rotatable pinion 19 is mounted onto the free end of the shaft journal 15. This pinion constantly engages the gear rack 21 which is attached to the switching bar 20.

The main drive shaft 12 and the inner radial portion of the spur gear 10 are held firmly in the bushing 3 by means of an axial thrust bearing 22. Axial displacement of the drive shaft is prevented by the lock washer 23.

The right end 12a (in FIG. 1) of the main drive shaft 12 has a smaller diameter than the left end and carries five cam discs 25 together with a corresponding number of spacers 26. These spacers are annular in shape and their outer diameter is the same as that of the thicker left end portion of the main drive shaft 12 in FIG. 1. The middle spacers 26 may be displaced axially along portion 12a of the shaft 12 and they are prevented from rotating with respect to the shaft since their tips project into a longitudinal groove on portion 12a of the shaft. The individual cam discs, however, are mounted on portion 12a of the shaft in such a manner that they may rotate. The cam discs 25 are firmly held in place, in their respective locations, by means of a clamping arrangement. This arrangement comprises a plurality of spheres 30, a bolt 31 which screws into the center of the free end of the shaft portion 12a, and a pressure plate 32. The conical central bore hole of this plate engages the tightly packed circle of spheres 30. When the bolt 31 is screwed into the respective drill hole in the shaft portion 12a, pressure is applied to a larger, centrally located sphere 33. This pressure is uniformly transferred to the pressure plate 32 via the packed circle of spheres 30. In such a manner, cam discs 25 are braced against one another and pressed axially against the shaft portion 12a. When threaded bolt 31 is loosened, each of the five cam discs can be rotated individually so as to permit positioning of their cams with respect to the assigned microswitches (See FIG. 2).

Of the five cam discs represented in FIG. 1, three are intended for the switch positions left, right and center, one is for establishing the direction on start-up from a central position and the fifth is for reducing the speed when approaching the central position.

An indicating disc 36 serves to indicate the present gear stage or the present RPM range. This disc is secured to the free end of shaft portion 12a by means of a set screw 35, and the ring-shaped surface 37 of the disc which faces outwardly is equipped with RPM markings 38. In order to view these RPM markings, an observation window 40 is provided in the cover 39 which surrounds the entire gear assembly. Directly beside this window 40 another aperture 41 is located in the end plate. A socket wrench can be inserted through this aperture 41 to engage the square head 42 on shaft portion 12a to thereby permit the shaft to be rotated manually in case the electrical system fails.

Figure 2:
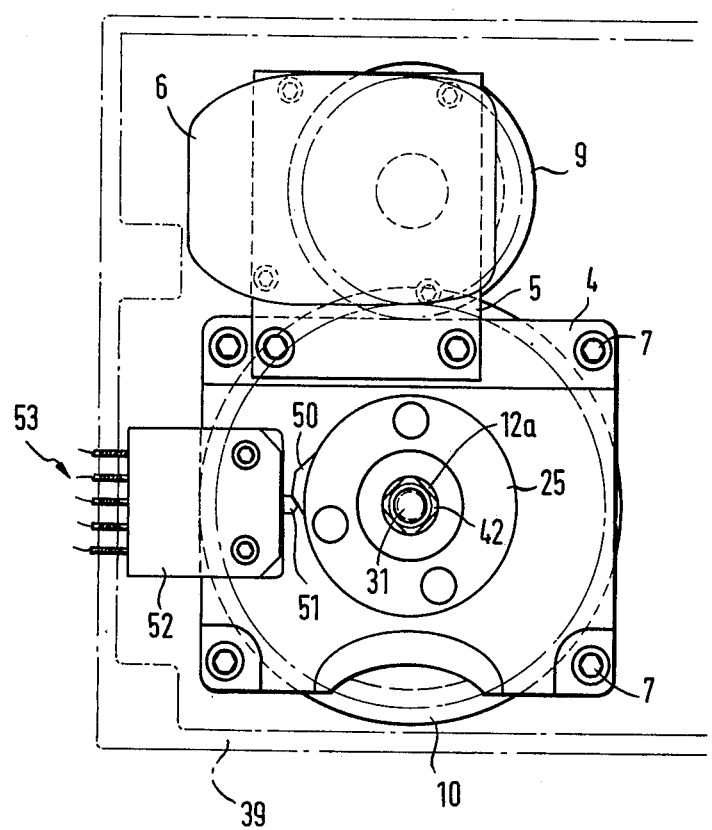
FIG. 2 is a schematic plan view of the top of the switching device shown in FIG. 1 having one cam disc and one microswitch.

It is apparent from FIG. 2 that the one-piece bearing housing, comprising the bushing 3 and the rigid, rectangular flange 4, may be precision cast. This schematic representation also shows the mode of construction of the cam discs 25. The plate shown has a radial cam 50 with sloping ends on its outer perimeter. On rotating cam disc 25, cam 50 actuates switch pin 51 on switch 52. A separate switch 52 is assigned to each cam disc 25. In order to simplify assembly thereof, the switches are located in a single housing mounted on flange 4. Electrical leads 53 come out of the switches 52 and are fed either to a program control unit for the machine tool or to a switch box (not shown). In this switch box, the individual gear stages or speed ranges are preset, e.g. by means of a push button, in order to initiate the necessary switching sequences.

Figure 3:
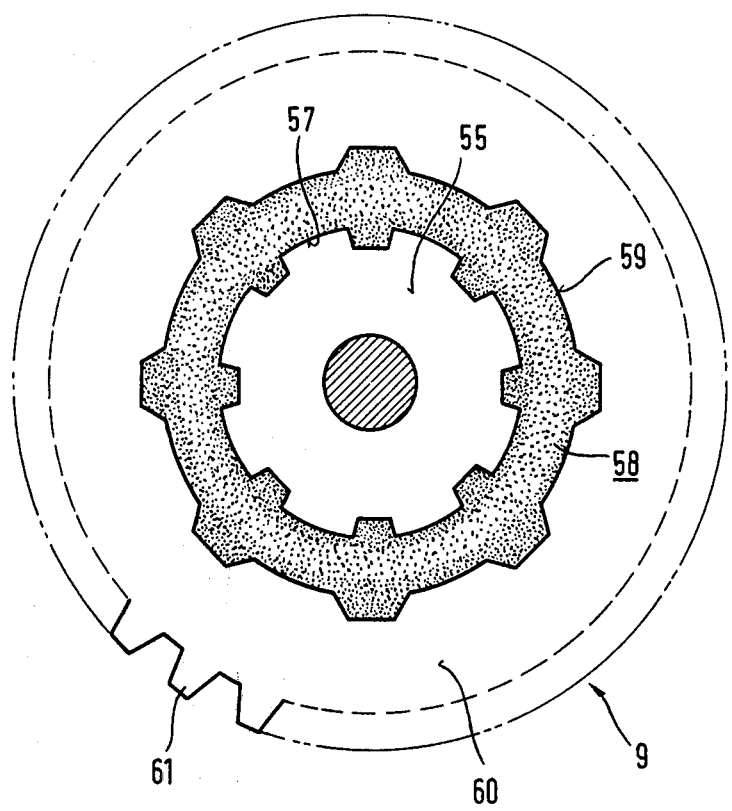
FIG. 3 is a schematic front view of an elastic gear wheel of this invention made of a bonding material.

The gear wheel 9 represented in FIG. 3 in an enlarged front view differs from prior art spur gears by virtue of the fact that it possesses a rubber-metal connection. The gear comprises an inner hub 55 by means of which the gear is attached to the drive shaft 8 of the servomotor 6 by a nut 56 (See FIG. 1), splines or some other suitable device. In the embodiment shown, this hub possesses a polygonal periphery 57 to which an annular ring 58 is attached by vulcanization or bonding, for example. The annular ring is made of a tough elastic material, e.g. rubber or a suitable polymer. This annular ring 58 serves as a shock absorber in the drive assembly and serves to suppress the often severe shock loading effects which occur in switching gear stages. The entire assembly and the components of the servomotor are thus protected from mechanical overstress and concomitant premature failure.

A collar 60 is attached, by vulcanization or bonding, to the polygonal periphery 59 of the elastic annular ring 58. This collar 60 is made of a sufficiently strong material, e.g. steel. This collar 60 has a typical tooth construction 61 on its outer perimeter. The shape of the contacting surfaces 57, 59 between the central annular ring 58 and the respective contacting radial parts of hub 55 and collar 60 may be smooth, toothed or undulating. The annular ring 58 should possess sufficient radial strength, depending upon the materials employed, to ensure that the desired damping effect is achieved.

The damping effect realized by utilization of the elastic gear wheel 9 may be further enhanced by using a suitable elastic linkage 62 (FIG. 1). This linkage 62 may also be employed as a substitute for the elastic gear wheel 9. This linkage 62 serves to connect two torque transferring members, in this case the drive shaft 8 of the servomotor and the shaft journal 63. The elastic linkage, in the example represented here, comprises a torus-shaped rubber sleeve vulcanized onto metal collars disposed on two inner annular surfaces thereof. These collars are non-rotatably connected to shaft 8 and/or shaft journal 63. The elastic linkage may also assume other constructional forms, such as, for example, elastomeric deformable discs, axial pins in elastic bearings or any other linkages which assure sufficient damping. Slipping clutch units may also be substituted for the elastic linkages.

The invention is not limited to the embodiment here described. Thus, for example, cam discs 25, together with spacers 26 therebetween, may be held in place on the shaft portion 12a by means of simple screw-operated clamps. If the dimensions of the connecting piece 2 are increased, or if this connecting piece is exchanged for a stronger connecting piece, then the switching device described in the present invention may be employed in gear drive housings of varying dimensions. If the dimensions of the connecting piece are increased, an extension piece would be employed between the shaft pin 15, located in the cover plate 1, and the left end of the shaft 12 in FIG. 1. This extension piece would have slots at both ends in order to prevent the connection from rotatably slipping.

In view of the above description, it is likely that modifications and improvements will occur to those skilled in the art which are within the scope of this invention.

What is claimed is:

1. In a machine tool having a plurality of sliding gear blocks and associated switching bars, a switching device for variable speed gears comprising:
    motor means;
    a shaft driven by said motor means;
    a main drive shaft;
    a switching bar movable in response to rotation of said main drive shaft;
    a plurality of gears intermeshing to form a gear train mechanically linking said motor drive shaft with said main drive shaft, said gear train and said motor means being adapted for switching through individual gear stages;
    a shock absorber element disposed within said gear train intermediate said shaft driven by said motor means and said switching bar;
    a plurality of rotatable, individually adjustable cam discs mounted in sequence axially along said main drive shaft;
    a plurality of switches, each one of said switches being actuable by rotation of an associated one of said cam discs;
    a plurality of non-rotatable, axially displaceable spacers mounted on said main drive shaft, one of said spacers being disposed between adjacent ones of said cam discs; and
    clamping means comprising a spherical, key-bed transmission actuated by means of threaded bolts adapted to be tightened to exert axial pressure on said cam discs and said spacers to prevent said cam discs and said spacers from rotating on said main drive shaft and to be loosened to permit rotation of individual ones of said cam discs about said main drive shaft.

2. In a machine tool having a plurality of sliding gear blocks and associated switching bars, a switching device for variable speed gears comprising:
    motor means;
    a shaft driven by said motor means;
    a main drive shaft;
    a switching bar movable in response to rotation of said main drive shaft;
    a plurality of gears intermeshing to form a gear train mechanically linking said motor drive shaft with said main drive shaft, said gear train and said motor means being adapted for switching through individual gear stages;
    a shock absorbing element disposed within said gear train intermediate said shaft driven by said motor means and said switching bar;
    a plurality of rotatable, individually adjustable cam discs mounted in sequence axially along said main drive shaft;
    a plurality of switches, each one of said switches being actuable by rotation of an associated one of said cam discs;
    a disc with markings attached to a free end of said main drive shaft and adapted to indicate the engaged gear stage of said variable speed gears; and
    a window disposed in a common housing surrounding said switching device and adjacent said free end of said main drive shaft, said window being adapted for viewing said disc with markings.

3. The switching device of claim 2 wherein said free end of said main drive shaft is poly-sided and is adapted to accommodate a corresponding shaped tool, said poly-sided free end being accessible through an aperture in said common housing.

4. In machine tools having a plurality of sliding gear blocks and associated switching bars, a switching device for variable speed gears, said switching device comprising:
    a gear drive housing;
    a bearing housing rigidly mounted on said gear drive housing, said bearing housing comprising a bushing, a flange and a support plate;
    an electric servomotor rigidly mounted on said support plate, said servomotor having a drive shaft;
    a main drive shaft journaled in said rigid bushing in spaced, axially parallel relationship with respect to said servomotor drive shaft;
    a gear rack mounted to one of said switching bars;
    gear train means coupling said servomotor drive shaft, said main drive shaft and switching bar for linear movement of said switching bar in response to rotation of said servomotor drive shaft;
    a plurality of independently rotatably adjustable cam discs on said main drive shaft and rotatable therewith;

a plurality of switches mounted to said flange, each of said switches being actuable by one of said cam discs; and elastic shock absorbing means disposed within said gear train intermediate said servomotor drive shaft and said switching bar to absorb any sudden shocks occasioned by operation of the switching device without affecting the distance moved by said switching bar in response to rotation of said servomotor drive shaft.

5. The switching device of claim 1, 2 or 4 wherein said gear train comprises a gear reduction unit having a driver gear wheel rigidly mounted on said main drive shaft to rotate therewith.

6. The switching device of claim 5 wherein said shock absorbing element comprises one of said gears of said gear train, said one gear having an elastic damping element.

7. The switching device of claim 6 wherein one gear comprises:
 an inner circular rigid section;
 an outer rigid ring section; and
 an annular shaped ring disposed in a radially central position on said one gear intermediate said inner circular section and said outer ring section, said annular shaped ring being formed of an elastic damping material and being firmly bonded to said inner circular section and said outer ring section.

8. The switching device of claim 1, 2 or 4 wherein such shock absorbing element comprises a linkage in said servomotor drive shaft.

* * * * *